_United States Patent Office_

2,754,325
Patented July 10, 1956

2,754,325

OXIDATION WITH PEROXIDES

Curtis W. Smith, Berkeley, Calif., assignor to Shell Development Company, Emeryville, Calif., a corporation of Delaware No Drawing. Application May 27, 1952,
Serial No. 290,329

11 Claims. (Cl. 260—536)

This invention relates to the controlled oxidation of organic compounds with peroxide oxidizing agents. It deals with new and more advantageous catalysts for promoting this type of oxidation and with an improved method for carrying out these oxidations using the new catalysts.

Peroxides are recognized as advantageous for the oxidation of a great many different organic compounds to more valuable products without the excessive degradation of carbon structure which often accompanies the use of other oxidizing agents. Peroxides are especially useful for the addition of oxygen to olefinic compounds, as in the hydroxylation or epoxidation of olefins, for instance. They are also used in the oxidation of ketones to lactones and/or polyesters, the conversion of olefins to ketones or aldehydes, and like reactions. While some of these oxidations can often be carried out non-catalytically, it is generally more advantageous to employ a catalyst to promote the reaction. A variety of diverse catalysts have been suggested for oxidations of this type, particularly hydroxylation of olefinic compounds, but none of them has proved entirely satisfactory in all respects. Osmium tetroxide, for instance, has proved quite useful for laboratory preparations, but its very high cost and physiological dangers restrict its application on a commercial scale to high-priced oxidation products such as pharmaceuticals. The tungstic acid oxidation catalysts described and claimed in Bergsteinsson patent, U. S. 2,373,942, are more generally useful for the large scale manufacture. However, tungstic acid has an inherent disadvantage as an oxidation catalyst due to its insolubiltiy in the media in which it is most advantageous to carry out the reactions, particularly hydroxylations. On completion of the peroxide reaction, the catalyst forms a colloidal precipitate which is difficult to completely remove by filtration or centrifugation, and which tends to slowly deposit in the pipe lines, stills and other apparatus of the plant, interfering with smooth operation by requiring frequent shutdowns for cleaning and leading to considerable loss of catalyst and danger of contamination of the product. Other types of catalysts which have been proposed, such as molybdic acid, vanadium pentoxide and the like, are less effective and give lower yields of desirable products.

An important object of the present invention is to overcome the foregoing disadvantages of prior methods of oxidizing organic compounds Another object is to provide a new class of water-soluble catalysts for promoting the addition of oxygen to organic compounds without undesirable degradation of the carbon structure. A special object is the provision of a method of hydroxylating olefinic compounds by reaction with peroxides which is simple to carry out and gives high yields and conversions to polyhydroxy compounds. Further objects and advantages of the invention will be apparent from the following description of the new process in which its application to the hydroxylation of olefins with hydrogen peroxide will be emphasized as a means of making the description simpler and more concrete, although the wide applicability of the invention to other oxidations with peroxides will also be shown.

It has been found that the heteropoly acids of the acid-forming elements of group VI of the periodic table are an especially advantageous class of catalysts for the oxidation of organic compounds by reaction with percompounds. These acid catalysts can be readily and economically produced from available materials and are not only sufficiently water-soluble so that they are free from the difficulties of the prior tungstic acid catalyst, but also give improved yield and conversions to desirable oxidation products, especially polyhydroxy products. A particularly advantageous class of these catalysts is the heteropoly acids of metals of subgroup A of group VI with elements of subgroup B of the same group, particularly the heteropolytungstic acids of sulfur, selenium or tellurium. However, not only can heteropolymolybdic and heteropolychromic acids of sulfur, selenium or tellurium be used in the same way, but heteropoly acids derived from other combinations of acid-forming elements of group VI, such as mobydotungstic and chromotungstic acids, etc., are effective catalysts for effecting addition of oxygen to organic compounds by reaction with peroxides. More than two different heteroacid-forming elements from group VI can be present in the catalyst, selenomolybdotungstic acid and thiotellurotungstic acid being typical examples of acids of this type which are suitable.

The proportions in which the different group VI elements can be present in the new heteropoly acid catalysts can vary from 1:1 to 12:1 atoms of one element or elements for each atom of the other group VI acid-forming element in the catalyst. Typical examples of preferred biheteropoly acids of tungsten which are especially effective are: 12-tungsto-sulfuric acid, 12-tungsto-selenic acid, 9-tungsto-selenic acid, 12-tungsto-telluric acid, 6-tungsto-telluric acid, 3-tungsto-telluric acid, 12-tungsto-chromic acid, 9-tungsto-chromic acid, 12-tungsto-molybdic acid, 9-tungsto-molybdic acid, 6-tungsto-molybdic acid, 3-chromo-tungstic acid, 3-molybdo-tungstic acid, and 6-molybdo-tungstic acid. Advantageous more complex heteropoly acid catalysts of tungsten with other group VI elements are, for instance, 9-tungsto-3-sulfo-selenic acid, 9-tungsto-3-seleno-telluric acid, 9-tungsto-3-telluro-selenic acid, 6-tungsto-6-molybdo-selenic acid, 9-tungsto-3-molybdo-selenic acid, 9-tungsto-3-chromo-telluric acid, 9-molybdo-3-sulfo-tungstic acid, 9-molybdo-3-seleno-tungstic acid, 9-molybdo-3-telluro-tungstic acid, 9-molybdo-3-chromo-tungstic acid, and 6-chromo-6-molybdo-tungstic acid. Other heteropoly acids of Group VI elements which are effective hydroxylation catalysts are 12-molybdo-sulfuric acid, 12-molybdo-selenic acid, 6-molybdo-selenic acid, 12-molybdo-telluric acid, 9-molybdo-tungstic acid. Other heteropoly acids of group VI acid, 12-chromo-telluric acid, 12-molybdo-chromic acid, 9-chromo-molybdic acid, 9-molybdo-3-sulfo-selenic acid, 9-molybdo-3-seleno-telluric acid, 9-molybdo-3-telluro-selenic acid, 9-molybdo-3-chromo-sulfuric acid, 9-molybdo-3-chromo-selenic acid, 9-molybdo-3-chromo-telluric acid, 6-chromo-6-molybdo-selenic acid, and 9-chromo-3-molybdo-telluric acid. Also useful are the sulfo-tungstic acids, e. g. 9-sulfo-tungstic acid, the seleno-tungstic and molybdic acids, such as 9-seleno-tungstic acid and 12-seleno-molybdic acid, the tellurotungstic acids as 12-telluro-tungstic acid, and the like. These and other heteropoly acids of elements of group VI which are suitable for use as catalysts in the new process can be prepared by any of the known methods of producing acids of this type. For example, a solution of the salts of two or more acids of group VI elements may be acidified with hydrochloric acid, for instance, and the resulting heteropoly acid extracted with solvent, such as ether, from which the desired heteropoly acid can be recovered by evaporation.

The heteropoly acids of elements of group VI are effective catalysts for the hydroxylation of olefinic compounds of many different types. Among the olefinic hydrocarbons which have been successfully hydroxylated are, for example, mono-olefins such as ethylene, propylene, 1-butene, 2-butene, isobutylene, the amylenes, 1-octene, 1-decene, dodecenes from propylene polymerization, 1-hexadecene, cyclopentene, cyclohexene, 4-methylcyclohexene, octahydronaphthalene, and styrene; polyolefins such as alliene, butadiene, isoprene, cyclopentadiene, cyclohexadiene, hexahydronaphthalene, 1,4-divinylbenzene, etc. Unsaturated alcohols are another class of olefinic compounds which can be effectively hydroxylated with the described new hydroxylation catalysts. These alcohols include, for instance, allyl alcohol, methallyl alcohol, crotyl alcohol, allyl carbinol, methyl vinyl carbinol, dimethyl allyl carbinol, oleyl alcohol, citronellol, geraniol, linaliol, cyclohexenol, the terpineols, cinnamyl alcohol, and related mono- and poly-olefinic mono- and poly-hydroxy alcohols. Ethers of the foregoing alcohols which may be the simple ethers or mixed ethers with either saturated or unsaturated alcohols, as well as vinyl ethers, can likewise be hydroxylated with advantage under the catalytic influence of the described heteropoly acids. Typical of these ethers are methyl vinyl ether, divinyl ether, allyl vinyl ether, diallyl ether, ethyl allyl ether, isopropyl isopropenyl ether, isocrotyl butyl ether, allyl cyclohexyl ether, methyl cyclohexenyl ether, ethyl oleyl ether, methallyl cinnamyl ether, etc.

Unsaturated carboxylic acids such as acrylic acid, methacrylic acid, crotonic acid, vinyl acetic acid, tiglic acid, oleic acid, linoleic acid, ricinoleic acid, sorbic acid, maleic acid, tetrahydrobenzoic acid, cyclohexylidene acetic acid, cinnamic acid, etc. can likewise be hydroxylated with advantage by the new process. Esters of these acids with saturated or unsaturated alcohols or esters of the previously mentioned olefinic alcohols with carboxylic acids constitute another class of unsaturated compounds with which the present catalysts are especially useful in promoting hydroxylation. Examples of suitable esters are, for instance, methyl acrylate, ethyl methacrylate, propyl crotonate, allyl crotonate, allyl acetate, oleyl acetate, cyclohexyl acrylate, diethyl maleate, acrolein diacetate, oleyl cinnamate, ethyl linoleate, and the like. Olefinic ketones or aldehydes can also be reacted under the catalytic influence of heteropoly acids of elements of group VI of the Periodic Table in accordance with the invention, although oxidation to acids may accompany the hydroxylation in the case of the olefinic aldehydes. Carbonyl compounds of this type which can be used in the process are, for example, methyl vinyl ketone, methyl allyl ketone, ethyl isopropenyl ketone, mesityl oxide, phorone, isophorone, methyl cyclohexenyl ketone, vinyl phenyl ketone, benzolacetone, acrolein, crotonaldehyde, citronellol, the cyclocitrals, ionone, cinnamyl aldehyde, etc. Unsaturated halides such as allyl chloride, crotyl bromide, methallyl chloride and the like are another type of olefinic compounds which can be successfully hydroxylated with the described heteropoly acid catalysts which are also effective with unsaturated oximes and amines such as diallyl amine, etc.

Any suitable peroxy compound can be used as oxidizing agent in the new process. Most preferably hydrogen peroxide is employed for hydroxylation but other inorganic peroxides and organic peroxides are effective. Sodium and barium peroxide, and the like are examples of other inorganic peroxides which can be used, while typical organic peroxides are, for instance, tertiary butyl peroxide or hydroperoxide, benzoyl peroxide, performic, peracetic, perphthalic and like acids, etc., as well as the mixture of peroxides obtainable by partial oxidation of hydrocarbons, for example, as described in U. S. Patent 2,376,257.

The oxidation reaction is preferably carried out in the liquid phase and, most advantageously, in a mutual solvent for the reactants, preferably in an aqueous medium when hydroxylating water-soluble olefinic compounds. A stoichiometric excess of the olefinic compound being hydroxylated to peroxy hydroxylating agent is generally desirable. Most preferably, about 1.1 to about 4 moles of olefinic compound per mole of peroxide is used. At temperatures of the order of about 0° C. to about 100° C., the reaction can usually be completed in from about 2 to 6 hours. The reaction time can usually be reduced by reacting at a temperature of about 40° C. to 60° C. until substantially all the free peroxide has reacted and then completing the hydroxylation at a higher temperature within the range of 60° C. to about 100° C. as described and claimed in copending application Serial No. 284,833, filed April 28, 1952. The optimum operating conditions in any case will depend upon the particular olefinic compound which is to be hydroxylated and the hydroxylating agent chosen. As a general rule, an amount of heteropoly acid of elements of group VI between about 0.1% and about 25% by weight of the organic compound which is being oxidized is effective, the preferred range being about 1% to about 10% for the hydroxylation of water-soluble olefinic compounds in aqueous solution.

Either batch, intermittent or continuous methods of operation can be used. On completion of the reaction, the catalyst can be recovered by distilling the reaction mixture to remove the product or products and any unreacted components from the catalyst which remains completely dissolved throughout the operation and can be returned for reuse in the process as a solution in the solvent, preferably water, employed as the reaction medium. Where the product can be crystallized from the reaction mixture, it can be separated in this way and the mother liquor containing the catalyst in solution can then be returned to the reactor for further production of hydroxylation or other oxidation product. If by-products build up in the mother liquor to the point at which its return to the reactor becomes undesirable, the heteropoly Group VI acid can be recovered therefrom by extraction with ether. Alternatively, such ether extraction can be used to recover the catalyst directly from the reaction mixture. In any case, no regeneration treatment is necessary to reactivate the new catalysts which can be repeatedly reused in the process.

The following examples illustrate some of the applications of the new process in hydroxylation reactions and show some of its advantages.

*Example I*

Allyl alcohol was hydroxylated to produce glycerol by reaction with hydrogen peroxide in a stirred reactor provided with a reflux condenser using selenotungstic acid as the catalyst. The reactor was charged with 2106 parts by weight of water, 174 parts of allyl alcohol and 10.2 parts of the selenotungstic acid ($H_7SeW_{12}O_{42}$) catalyst. The mixture was heated to 50° C. with stirring and 150 parts by weight of a 34% aqueous hydrogen peroxide solution was added. The temperature was kept at 50° C. for 2 hours by cooling with a stream of air, then was raised to 70° C. for one hour. Titration of the reaction mixture showed 89.9% conversion of hydrogen peroxide to glycerol which was recovered by first distilling off the excess allyl alcohol and then the glycerol, leaving an aqueous solution of the selenotungstic acid which can be reused as catalyst in the process.

Similar good results are obtained when using as catalyst a sulfotungstic acid produced by mixing sulfuric acid and sodium tungstate in a mole ratio of 5 to 1. With both the sulfotungstic and selenotungstic acids, the catalysts remain completely soluble in the reaction mixture throughout the process. This is in contrast to tungstic acid catalyst which not only precipitates from the reacted mixture in a slowly settling, difficultly filterable, colloidal form which makes product recovery difficult, but also gives lower yields of glycerol under the same reaction conditions.

*Example II*

Using the method of Example I, allyl alcohol was hydroxylated with hydrogen peroxide in the presence of tellurotungstic acid ($H_7TeW_{12}O_{42}$) which likewise was soluble in the reaction mixture throughout the process. With a mole ratio of water to allyl alcohol of 39:1, two moles of allyl alcohol per mole of hydrogen peroxide, and 7% by weight of tellurotungstic acid catalyst based on the allyl alcohol, there was obtained an 88.7% conversion of hydrogen peroxide to glycerol in a yield of 89% based on the allyl alcohol reacted.

Equally good results are obtained when using 12-tungsto-molybdic acid and 12-tungsto-chromic acid as catalysts under the same conditions.

*Example III*

Cyclohexene was hydroxylated by reaction with hydrogen peroxide using acetic acid as the solvent. The reaction was carried out with a mole ratio of cyclohexene to hydrogen peroxide of 2:1 by gradually adding 102 parts by weight of a 33.4% hydrogen peroxide solution over a period of one hour to a solution at 50° C. of 164 parts by weight of cyclohexene in 724 parts of acetic acid containing 5 parts of 12-tungsto-selenic acid. After three hours at 50° C. 90.7% of the hydrogen peroxide had reacted and the excess cyclohexene, 81 parts by weight, was removed by steam distillation. The residue was acetylated with acetic anhydride and then distilled to obtain, besides acetic acid and acetic anhydride, 168 parts by weight of 1,2-cyclohexanediol, boiling at 123° C.–125° C. at 15 mm. of mercury pressure. This corresponds to a yield of 92.5% based upon the hydrogen peroxide reacted.

Good results are also obtained by the use of 12-molybdo-telluric acid or 12-tungsto-molybdic acid in place of selenotungstic acid under the same conditions.

*Example IV*

Maleic acid is hydroxylated readily to tartaric acid by reaction with hydrogen peroxide in aqueous solution using 12-tungsto-selenic acid as the catalyst. With two moles of maleic acid per mole of hydrogen peroxide, a catalyst concentration of 8% by weight of the maleic acid, and about 70 moles of water per mole of maleic acid, the reaction of the hydrogen peroxide was practically complete in 4 hours at 70° C. Heating the reaction mixture for another hour at about 100° C. and then crystallizing the tartaric acid produced from the reacted mixture by cooling to about 5° C. gives a tartaric acid yield of over 90% based upon the hydrogen peroxide used. The recovered tartaric acid is free from catalyst which remains completely dissolved in the mother liquor. By recycling the mother liquor containing the excess maleic acid and catalyst to the reactor with addition of aqueous hydrogen peroxide and maleic acid, substantially complete conversion of the maleic acid to tartaric acid can be achieved.

Instead of maleic acid, maleic anhydride or fumaric acid or anhydride can be used as the feed to the process. Tungstotelluric acids are equally useful as catalysts for the reaction.

*Example V*

Allyl alcohol in an aqueous hydrogen chloride solution was reacted with hydrogen peroxide using about 8% by weight, based on the allyl alcohol, of molybdotungstic acid as catalyst. The hydrogen peroxide in slight excess was slowly added to the aqueous solution of the other reactants at about 75° C. over a period of 2 hours and 40 minutes, after which the reaction was continued for an additional hour at the same temperature and then at room temperature until 67% of the peroxide had reacted. After stripping off water from the reaction mixture at 100 mm. mercury pressure, the residue was distilled at 0.3 mm. and a fraction boiling mainly at 85° C.–87° C. was obtained which analysis showed to correspond to a 59.8% conversion of allyl alcohol to glycerol monochlorohydrin. In contrast with the use of tungstic acid as catalyst, no colloidal precipitate interferes with product recovery when molybdotungstic acid is used as catalyst. Similar results are obtained with 12-molybdoselenic acid as the catalyst.

*Example VI*

Two moles, 194 grams, of 35.1% hydrogen peroxide were added slowly to a stirred mixture of four moles of 1-decene in 1450 grams of acetic acid containing about 65 grams of 12-molybdotungstic acid. The mixture was held at 50° C. for 7 hours and then allowed to stand overnight at room temperature. Titration indicated essentially complete reaction of the peroxide. Water was added and 1-decene corresponding to 2.62 moles was distilled off azeotropically. Water and acetic acid were then removed and the residue refluxed with 430 grams of methanol and 23 grams of hydrochloric acid, removing methyl acetate as formed. After removing the excess methanol, the product was fractionated to obtain in about 60% yield, based on 1-decene, 1,2-decanediol fractions boiling 92° C.–134° C. at 2 mm. and 103° C.–125° C. at 0.1 mm. Selenochromic acid gives similar results in this reaction, no separation of catalyst taking place in either case.

It will thus be seen that the new process offers many advantages in the addition of oxygen to different types of organic compounds by reaction with peroxides. It can be varied not only with respect to the organic compounds which may be thus oxidized and in regard to the peroxy compounds which may be used as oxidizing or hydroxylating agents, but also in relation to the conditions of operation. The invention will therefore be recognized as not restricted to the examples which have been given by way of illustration.

I claim as my invention:

1. A process for producing hydroxylation products which comprises reacting an organic compound having an olefinic double bond between two carbon atoms with aqueous hydrogen peroxide under the catalytic influence of a heteropoly acid containing an element of the group consisting of chromium, molybdenum and tungsten and an element of the group consisting of sulfur, selenium and tellurium as the essential effective catalyst for the reaction in a mutual solvent for the reactants, separating reaction product from the reacted mixture containing the completely dissolved catalyst and recovering the catalyst solution thus obtained.

2. A process in accordance with claim 1 wherein the reaction is carried out in an aqueous solvent and the catalyst is recovered substantially completely as an aqueous solution which is reused in the process as the reaction medium.

3. A process for producing a polyhydric organic compound which comprises reacting an aqueous solution of a water-soluble olefinic compound with aqueous hydrogen peroxide under the catalytic influence of a heteropoly acid containing an element of the group consisting of chromium, molybdenum and tungsten and an element of the group consisting of sulfur, selenium and tellurium as the essential effective catalyst for the reaction, separating reaction product from the aqueous reacted mixture containing the completely dissolved catalyst and returning the catalyst solution thus obtained to the reaction to effect further reaction.

4. A process in accordance with claim 3 wherein an olefinic alcohol is hydroxylated.

5. A process for producing a trihydric alcohol from the corresponding olefinic monohydroxy alcohol which comprises reacting said alcohol with aqueous hydrogen peroxide under the catalytic influence of a tungstoheteropoly acid of an element of the group consisting of sulfur, selenium and tellurium, distilling the reaction mixture to remove reaction product from an aqueous solution of the completely dissolved catalyst and recovering said catalyst for reuse in the process.

6. A process in accordance with claim 5 wherein the catalyst is a tellurotungstic acid.

7. A process of producing glycerine which comprises reacting a stoichiometric excess of allyl alcohol in aqueous solution with hydrogen peroxide in the presence of about 0.1% to about 25% by weight of the allyl alcohol of a heteropoly acid containing an element of the group consisting of chromium, molybdenum and tungsten and an element of the group consisting of sulfur, selenium and tellurium as the essential effective catalyst for the reaction, distilling off glycerol and unreacted allyl alcohol from the reacted mixture leaving an aqueous solution of the heteropoly acid catalyst and reusing the recovered catalyst in the process.

8. A process for producing a polyhydroxy carboxylic acid which comprises reacting the corresponding olefinic acid with aqueous hydrogen peroxide under the catalytic influence of a heteropoly acid containing an element of the group consisting of chromium, molybdenum and tungsten and an element of the group consisting of sulfur, selenium and tellurium as the essential effective catalyst for the reaction, separating reaction product from the aqueous reacted mixture containing the completely dissolved catalyst and returning the catalyst solution thus obtained to the reaction to effect further reaction.

9. A process in accordance with claim 8 wherein tartaric acid is produced by hydroxylating an acid of the group consisting of maleic and fumaric acids in the presence of tungstoselenic acid, tartaric acid is crystallized from the reacted mixture and separated from the mother liquor containing the completely dissolved catalyst and the mother liquor is recycled to the reaction.

10. A process of producing a glycol which comprises reacting a mono-olefin and aqueous hydrogen peroxide under the catalytic influence of a heteropoly acid containing an element of the group consisting of chromium, molybdenum and tungsten and an element of the group consisting of sulfur, selenium and tellurium as the essential effective catalyst for the reaction in a mutual solvent for the reactants, separating reaction product from the reacted mixture containing the completely dissolved catalyst and recovering the catalyst solution thus obtained.

11. A process in accordance with claim 10 wherein the catalyst is 12-molybdo-telluric acid and the reaction is carried out in acetic acid as the solvent.

References Cited in the file of this patent
UNITED STATES PATENTS

| | | |
|---|---|---|
| 2,373,942 | Bergsteinsson | Apr. 17, 1945 |
| 2,414,385 | Milas | Jan. 14, 1947 |
| 2,437,648 | Milas | Mar. 9, 1948 |
| 2,500,599 | Bergsteinsson et al. | Mar. 14, 1950 |
| 2,555,927 | Himel et al. | June 5, 1951 |
| 2,613,223 | Young | Oct. 7, 1952 |

OTHER REFERENCES

Mugdan et al.: Jour. Chem. Soc. London, 1949, pages 2988–2993.

Mugdan et al.: Chem. Abstracts, vol. 44, col. 3888–9 (1950).

Fuson: Advanced Organic Chemistry (1950), p. 236.